United States Patent
Chang et al.

(10) Patent No.: US 10,147,300 B1
(45) Date of Patent: Dec. 4, 2018

(54) METHOD FOR MONITORING EQUIPMENT BY ANALYZING TEMPERATURE VALUES COLLECTED FROM CYLINDER AND DISTRIBUTED ON COORDINATE PLANE

(71) Applicant: TCC INFORMATION SYSTEMS CORP., Taipei (TW)

(72) Inventors: Chien-Chih Chang, Taipei (TW); Yuan-Chen Chang, Miaoli County (TW); Ko-Yun Lee, New Taipei (TW)

(73) Assignee: TCC INFORMATION SYSTEMS CORP., Taipei (TW)

( * ) Notice: Subject to any disclaimer, the term of this patent is extended or adjusted under 35 U.S.C. 154(b) by 0 days.

(21) Appl. No.: 15/972,205

(22) Filed: May 6, 2018

(30) Foreign Application Priority Data

Oct. 16, 2017 (TW) .............................. 106135256 A (51) Int. Cl.
| | | |
|---|---|---|
| G08B 17/00 | (2006.01) | |
| G08B 21/18 | (2006.01) | |
| G01K 3/00 | (2006.01) | |
| G01K 3/14 | (2006.01) | |

(52) U.S. Cl.
CPC ........... *G08B 21/182* (2013.01); *G01K 3/005* (2013.01); *G01K 3/14* (2013.01)

(58) Field of Classification Search
CPC ......... G08B 21/182; G01K 3/14; G01K 3/005
USPC ........................................................ 340/584
See application file for complete search history.

(56) References Cited

U.S. PATENT DOCUMENTS

| | | | |
|---|---|---|---|
| 3,280,312 A | 10/1966 | Sandelien | |
| 2008/0082308 A1* | 4/2008 | Kant | .................... G05B 23/021 703/12 |
| 2009/0097805 A1* | 4/2009 | Bayindir | .......... B29D 11/00663 385/101 |
| 2012/0143377 A1* | 6/2012 | Ledung | ..................... C04B 2/10 700/274 |
| 2014/0147799 A1 | 5/2014 | Peterman | |
| 2015/0310678 A1* | 10/2015 | Ito | ........................... B60Q 9/00 701/32.3 |

(Continued)

FOREIGN PATENT DOCUMENTS

| | | |
|---|---|---|
| CN | 1566911 A | 1/2005 |
| CN | 101464093 A | 6/2009 |

(Continued)

*Primary Examiner* — Naomi J Small
(74) *Attorney, Agent, or Firm* — Winston Hsu (57) ABSTRACT

A set of sensors is disposed beside a cylinder to collect a first set of temperature points. The first set of temperature points is updated and distributed on a coordinate plane corresponding to a length and rotation degrees of the cylinder. The coordinate plane is segmented along a horizontal axis with a fixed length to define a rectangular area, and a second set of temperature points is distributed on the rectangular area. The second set of temperature points is a subset of the first set of temperature points. On the rectangular area, the second set of temperature points is clustered into n sets of temperature points using a k means algorithm. A notification signal is sent according to an $x_{th}$ set of temperature points of the n sets of temperature points. The $x_{th}$ set of temperature points has a highest mean temperature among the n sets of temperature points.

10 Claims, 8 Drawing Sheets

(56) References Cited

U.S. PATENT DOCUMENTS

2017/0188443 A1* 6/2017 Nakahara ................. H05G 1/26

FOREIGN PATENT DOCUMENTS

| CN | 103307872 A | 9/2013 |
| CN | 104197698 A | 12/2014 |
| CN | 105042599 A | 11/2015 |
| JP | 2012-237578 A | 12/2012 |

* cited by examiner

METHOD FOR MONITORING EQUIPMENT BY ANALYZING TEMPERATURE VALUES COLLECTED FROM CYLINDER AND DISTRIBUTED ON COORDINATE PLANE

CROSS REFERENCE TO RELATED APPLICATION

This application claims priority to Taiwan Patent Application No. 106135256, filed Oct. 16, 2017, and incorporated herein by reference in its entirety.

BACKGROUND OF THE INVENTION

1. Field of the Invention

The invention relates to a method for monitoring equipment, and in particular, a method for monitoring changes and distribution of temperature of equipment and sending notification accordingly.

2. Description of the Prior Art

In the industry such as cement, pharmaceutical or food processing, cylindrical heating devices have been widely used to heat materials. In order to maintain a cylindrical heating device, a temperature sensor can be disposed on or beside a cylinder. When an abnormal temperature (e.g. over temperature) is measured, a warning can be issued for triggering an emergency stop. Equipment can then be checked and cooled down to avoid damages.

The foresaid monitor method has shortcomings. When performing the method in practice, sometimes the equipment damage is unnoticed because temperatures measured by sensors are normal. This is due to uneven distribution of temperatures over a cylinder.

In the industry, early warning is useless when a notification cannot be sent before an accident occurs. Hence, a solution is required to issue an early warning before equipment is damaged.

SUMMARY OF THE INVENTION

An embodiment provides a method for monitoring equipment. The equipment has a cylinder having a length corresponding to a horizontal axis of a coordinate plane and a plurality of rotation degrees corresponding to a vertical axis of the coordinate plane. The method includes following steps. Collect a first set of temperature points when the cylinder rotates using a set of sensors disposed beside the cylinder where each temperature point has a horizontal coordinate of the horizontal axis, a vertical coordinate of the vertical axis and a temperature value. Update and distribute the first set of temperature points on the coordinate plane. Segment the coordinate plane along the horizontal axis with a fixed length to define a rectangular area wherein a second set of temperature points is distributed on the rectangular area, and the second set of temperature points is a subset of the first set of temperature points. Cluster the second set of temperature points into n sets of temperature points on the rectangular area using a k means algorithm. Send a notification signal according to at least an $x_{th}$ set of temperature points of the n sets of temperature points. The $x_{th}$ set of temperature points has a highest mean temperature among the n sets of temperature points.

Another embodiment provides an equipment monitor system for monitoring a cylinder. The system includes a set of sensors, a processor and an interface unit. The set of sensors is disposed beside the cylinder and used to collect a first set of temperature points when the cylinder rotates wherein each temperature point has a horizontal coordinate of a horizontal axis, a vertical coordinate of a vertical axis and a temperature value. The processor is linked to the set of sensors and used to receive the first set of temperature points, generate a coordinate plane with the horizontal axis corresponding to a length of the cylinder and the vertical axis corresponding to a plurality of rotation degrees of the cylinder, update and distribute the first set of temperature points on the coordinate plane, segment the coordinate plane along the horizontal axis with a fixed length to define a rectangular area with a second set of temperature points distributed on the rectangular area, use a k means algorithm to cluster the second set of temperature points into n sets of temperature points, and send a notification signal according to at least an $x_{th}$ set of temperature points of the n sets of temperature points, where the second set of temperature points is a subset of the first set of temperature points, and the $x_{th}$ set of temperature points has a highest mean temperature among the n sets of temperature points. The interface unit is linked to the processor and used to receive the notification signal and transmit a human perceivable warning according to at least the notification signal. The $x_{th}$ set of temperature points has a highest mean temperature among the n sets of temperature points.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
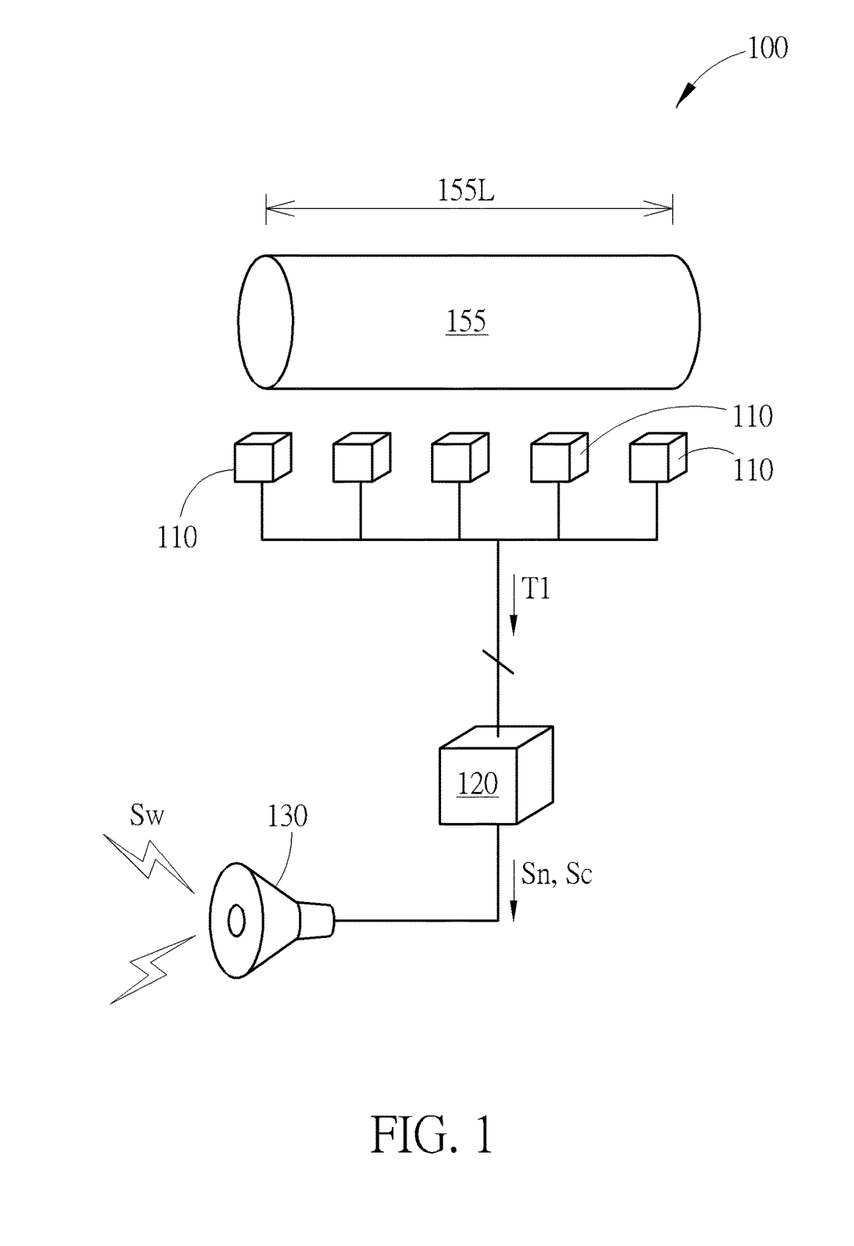
FIG. 1 illustrates a system according to an embodiment.

FIG. 1 illustrates a system 100 according to an embodiment. The system 100 is used to monitor equipment, and the equipment may include a cylinder 155. The system 100 may include a set of sensors 110, a processor 120 and an interface unit 130. The set of sensors 110 may include temperature sensors, disposed beside the cylinder 155 and used to collect temperature values. The processor 120 may be linked to the set of sensors 110 through wire or wirelessly and used to receive the temperature values to generate a notification signal Sn. The interface unit 130 may be linked to the processor 120 through wire or wirelessly and used to receive the notification signal Sn and transmit a human perceivable warning Sw according to at least the notification signal Sn.

According to another embodiment, the processor 120 may also generate a confirmation signal Sc, and the interface unit 130 may transmit the warning Sw according to the notification signal Sn and the confirmation signal Sc. Regarding generation of the notification signal Sn and the confirmation signal Sc, it is described below.

The interface unit 130 may include a speaker, a display or a warning lamp. The warning 130 may include warning sound, a displayed picture or warning light. The cylinder 155 may be a cement rotation kiln or a cylinder of a heating device for heating chemical materials or food materials. Number and disposal of the sensors 110 in FIG. 1 are for reference merely. The sensors 110 may be disposed according to dimensions of equipment, required accuracy and specification of the sensors.

Figure 2:
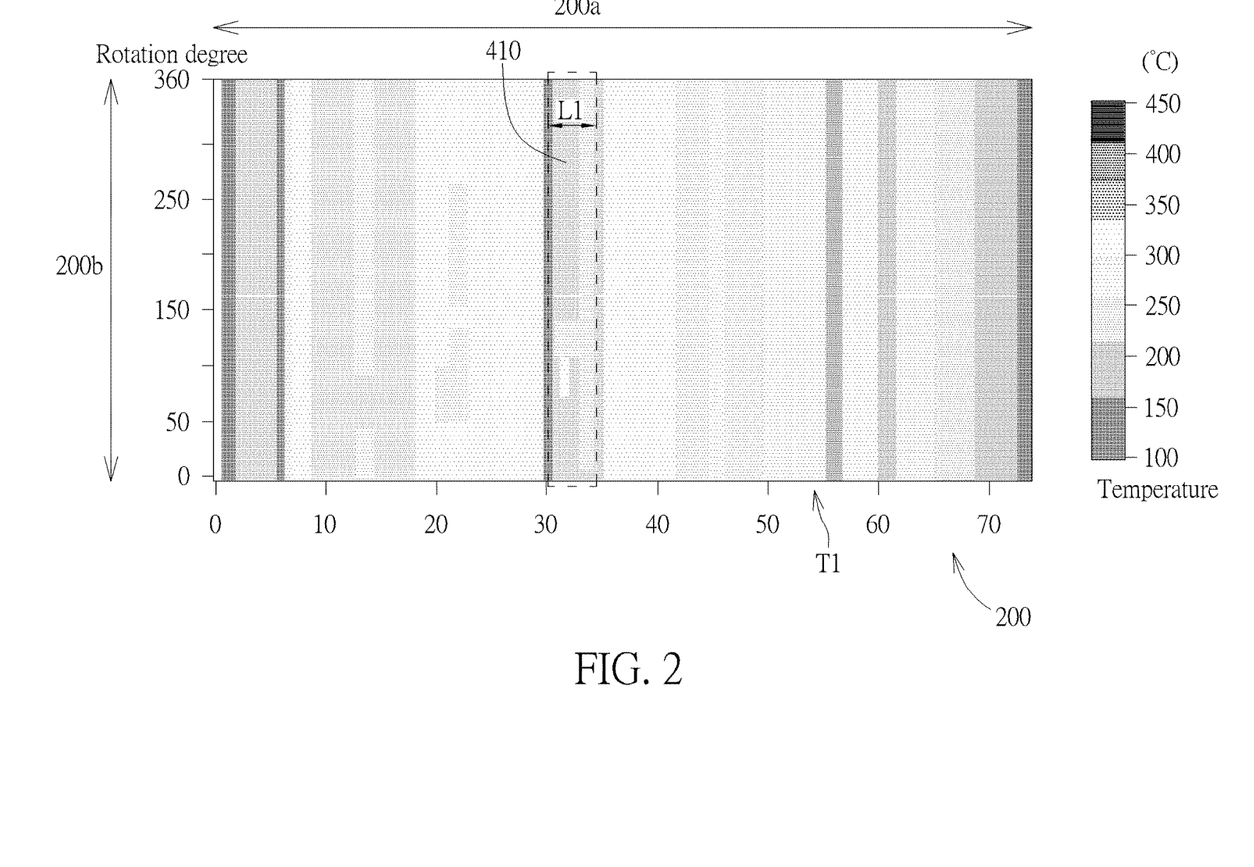
FIG. 2 illustrates that temperature points collected by sensors of FIG. 1 are shown on a coordinate plane.

FIG. 2 illustrates that the temperature values collected by the sensors 110 are shown on a coordinate plane 200. For example, when the system 100 has 30 sensors 110 arranged under the cylinder 155, the sensors 110 may collect temperature values constantly when the cylinder 155 rotates. Though the cylinder 155 is cylindrical, the cylinder 155 may be expanded to be a two dimensional shape. A length of the cylinder 155 (corresponding to a long side 155L in FIG. 1) may correspond to a horizontal axis 200a of a coordinate plane 200. A plurality of rotation degrees (e.g. 0° to 360°) of the cylinder 155 may correspond to a vertical axis 200b of the coordinate plane 200. Hence, the temperature values collected by the sensors 110 may be illustrated on the coordinate plane 200 according to locations on the coordinate plane 200 where the temperatures values are collected. In FIG. 2, the distribution of the temperature values on the coordinate plane 200 may be gradient. The temperature distribution may be visualized using dots illustrated with different densities. The illustration is merely an example, and another suitable visual format may be used by a designer for convenience. For example, different colors varying in gradient may be used to show the distribution of temperature.

Figure 3:
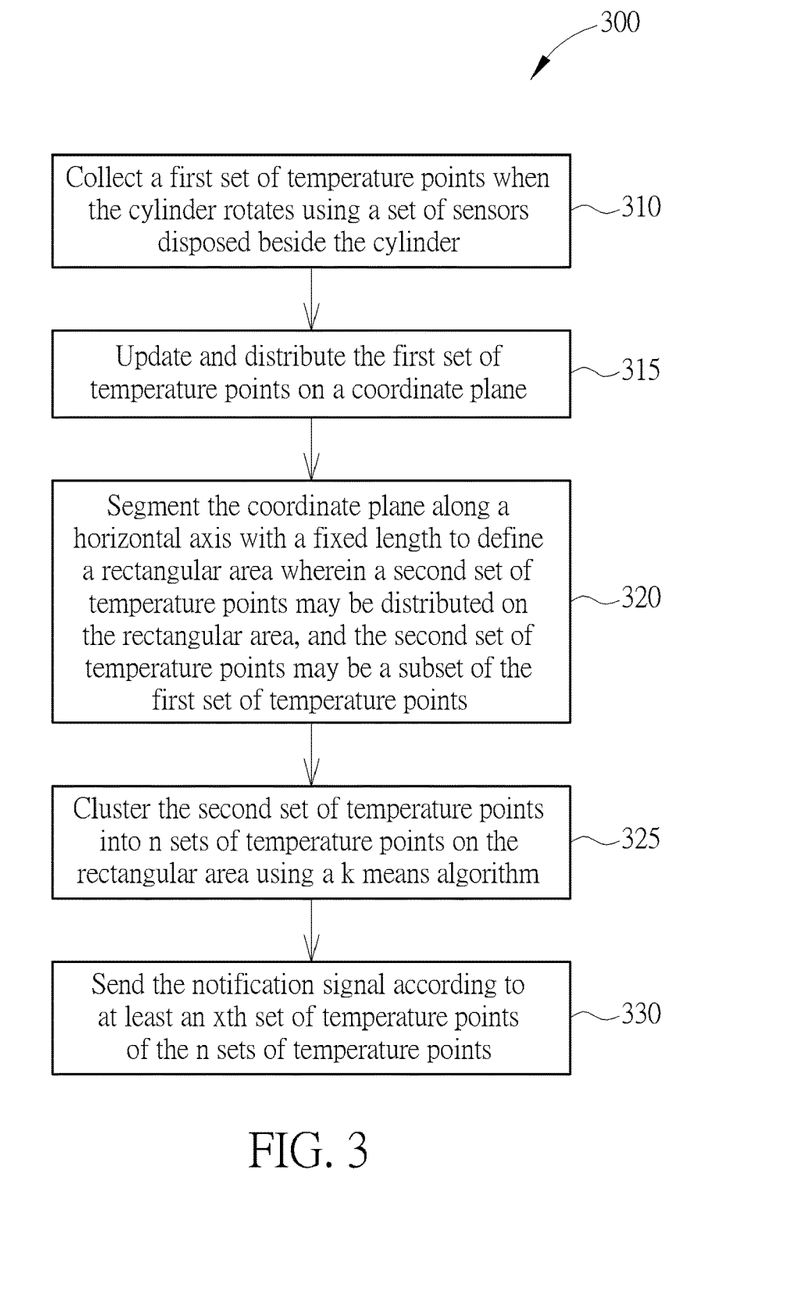
FIG. 3 illustrates a method for monitoring equipment according to an embodiment.

FIG. 3 illustrates a method 300 for monitoring equipment, and the method 300 may include following steps.

Step 310: collect a first set of temperature points T1 when the cylinder 155 rotates using a set of sensors 110 disposed beside the cylinder 155, each temperature point having a horizontal coordinate of the horizontal axis 200a, a vertical coordinate of the vertical axis 200b, and a temperature value;

Step 315: update and distribute the first set of temperature points T1 on the coordinate plane 200;

Step 320: segment the coordinate plane 200 along the horizontal axis 200a with a fixed length L1 to define a rectangular area 410 wherein a second set of temperature points T2 may be distributed on the rectangular area 410, and the second set of temperature points T2 may be a subset of the first set of temperature points T1;

Step 325: cluster the second set of temperature points T2 into n sets of temperature points G1-Gn on the rectangular area 410 using a k means algorithm; and Step 330: send the notification signal Sn according to at least an $x_{th}$ set of temperature points Gx of the n sets of temperature points G1-Gn.

The foresaid n and x may be positive integers, n>1, 0<x<(n+1), and the $x_{th}$ set of temperature points Gx may have a highest mean temperature value among the n sets of temperature points G1-Gn. Steps 315-330 may be performed by the processor 120. According to an embodiment, the warning Sw may be sent according to the notification signal Sn sent in Step 330. However, according to another embodiment, steps for confirmation may be performed to confirm that distribution and variation of temperature values are abnormal according to historic data, and the warning Sw may be sent according to the notification signal Sn and the confirmation signal Sc as described in FIG. 7 afterward.

In Step 315, the first set of temperature points T1 may be updated and distributed on the coordinate plane 200 periodically with a fixed time period. The fixed time period may be 5 minutes or another suitable time period, for example. Accuracy may be decreased if the fixed time period is excessively long. Computation of the processor and memory usage may be increased unnecessarily if the fixed time period is excessively short. Hence, the fixed time period may be adjusted for different industrial applications.

For example, when the cylinder 155 is a cement rotation kiln with a length of 70 meter, all temperature values measured by the set of sensors 110 (i.e. the temperature values of the first set of temperature points T1) may be drawn on the coordinate plane 200 as shown in FIG. 2. If the fixed length L1 in Step 320 is 5 meters long, the cylinder 155 may be segmented into (70÷5) segments, that is, 14 segments. One of the segments may be the rectangular area 410.

Figure 4:
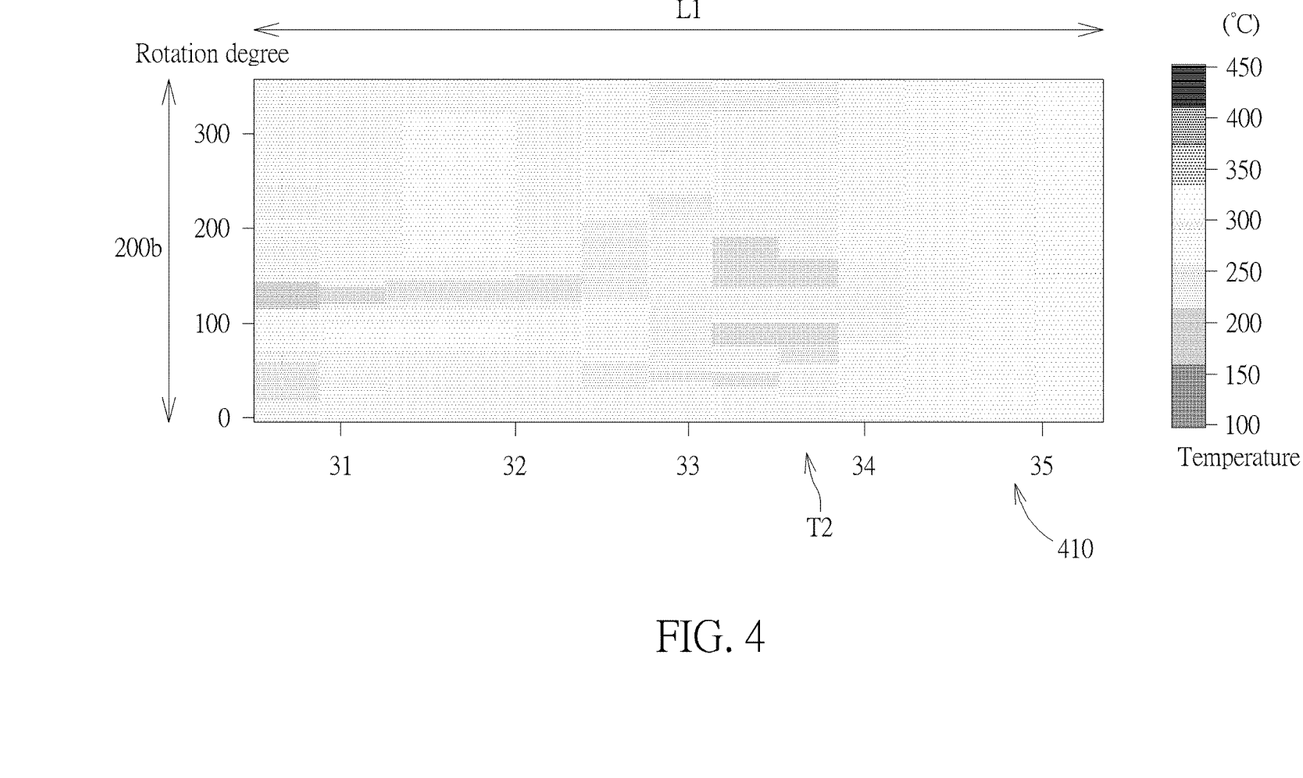
FIG. 4 illustrates temperature points distributed on the rectangular area of FIG. 2.

FIG. 4 illustrates the rectangular area 410 of FIG. 2. All temperature values distributed in the rectangular area 410 may be of the second set of temperature points T2, and are illustrated by corresponding gray levels.

Figure 5:
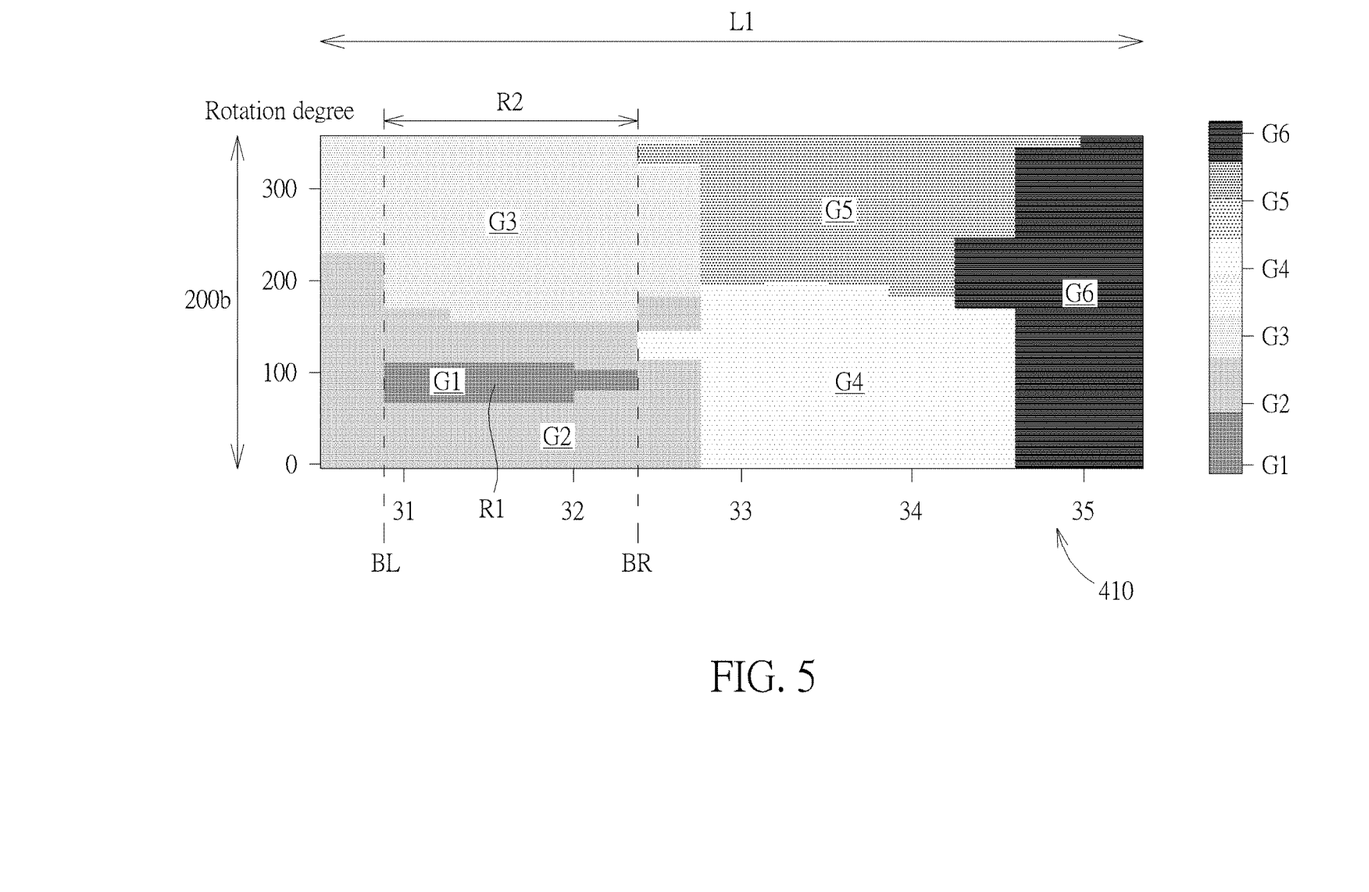
FIG. 5 illustrates a result of clustering the temperature points in the rectangular area of FIG. 2.

FIG. 5 illustrates a result of clustering the temperature points in the rectangular area 410. An example in which n=6 and x=1 is described below. In FIG. 5, the second set of temperature points T2 distributed in the rectangular area 410 in FIG. 4 may be clustered into 6 sets G1-G6 using the k means algorithm. In the sets, the first set of temperature points G1 may have a highest mean temperature among the 6 sets of temperature points G1-G6. Hence, in this example, the notification signal Sn may be sent according to at least the first set of temperature points G1 in Step 330.

As shown in FIG. 5, the first set of temperature points G1 may be on a first area R1. The first area R1 may have a left boundary BL and a right boundary of a first area BR. A second area R2 may be defined in the rectangular area 410 according to the left boundary BL and the right boundary BR of the first area R1. The first area R1 may be within the second area R2. As shown at the right of FIG. 5, regarding the six sets of temperature points G1-G6, different gray levels may correspond to different sets.

According to an embodiment, in Step 330, when a highest temperature value of the first set of temperature points G1 (i.e. a highest temperature value in the first area R1) exceeds a first threshold (e.g. 300° C.), a first condition may be met, and the processor 120 may send the notification signal Sn accordingly.

According to another embodiment, in Step 330, when a quotient exceeds a second threshold (e.g. 110%), a second condition may be met, and the processor 120 may send the notification signal Sn accordingly. The quotient may be obtained by dividing a mean temperature of the first set of temperature points G1 by a mean temperature of temperature points of the second area R2 excluding the first area R1.

According to another embodiment, in Step 330, when the first condition and the second condition are both met, the processor 120 may send the notification signal Sn accordingly. In this example, the number of false alarms may be reduced by double checking the two conditions. The foresaid first threshold and second threshold may be adjusted according to collected data and experience acquired from practical observation in order to send warning in advance without triggering a false alarm.

Figure 6:
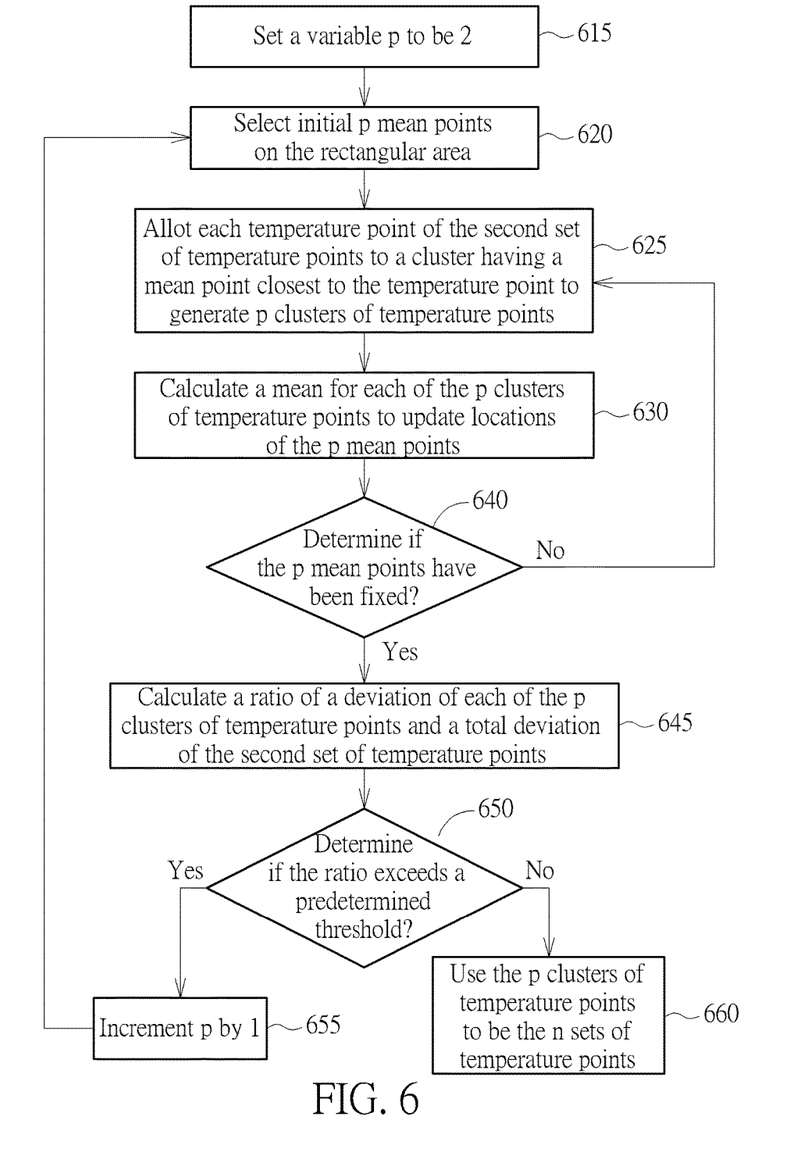
FIG. 6 illustrates a flowchart of performing a step of FIG. 3 according to an embodiment.

FIG. 6 illustrates a flowchart of performing Step 325 according to an embodiment. In Step 325, the second set of temperature points T2 may be clustered into n sets of temperature points G1-Gn as below.

Step 615: set a variable p to be 2;
Step 620: select initial p mean points on the rectangular area 410 to form p corresponding clusters;
Step 625: allot each temperature point of the second set of temperature points T2 to a cluster having a mean point closest to the temperature point to generate p clusters of temperature points;
Step 630: calculate a mean for each of the p clusters of temperature points to update locations of the p mean points in the rectangular area 410;
Step 640: determine if the p mean points have been fixed? If so, go to Step 645; else, go to Step 625;
Step 645: calculate a ratio Rt of a deviation of each of the p clusters of temperature points and a total deviation of the second set of temperature points T2;
Step 650: determine if the ratio Rt exceeds a predetermined threshold? If so, go to Step 655; else, go to Step 660;
Step 655: increment p by 1; go to Step 620; and
Step 660: use the p clusters of temperature points to be the n sets of temperature points G1-Gn.

In the above, p may a positive integer and p>1. The flow shown in FIG. 6 may be used to prevent the variation in each of the n sets of temperature points G1-Gn from being excessive so as to obtain the number n.

In Step 615, p is set to be 2, and this is an initial setting of the flow. When p=2, there are two mean points, and the two mean points may be used to form two clusters of temperature points respectively. Hence, according to the initial setting, the temperature points may be clustered into two clusters.

In Step 625, each of the temperature points is allotted to a cluster having a mean point closest to the temperature point through equation eq1:

$$G(x_j) = \min_{i=1-p} \Sigma_{h=1}^{3} (x_{jh} - \mu_{ih})^2 \quad \text{(eq1).}$$

Because the rectangular area 410 in FIG. 4 corresponds to three dimensions (i.e. a horizontal axis, a vertical axis and temperature), the dimension variable h in equation eq1 may be incremented from 1 to 3. G ($x_j$) may represent a set of temperature points which a temperature point $x_j$ is allotted into. The variable i is used for calculation and to express an $i_{th}$ set of temperature points. The variable $x_{jh}$ may represent a data value of a $j_{th}$ temperature point of the $i_{th}$ set of temperature points in an $h_{th}$ dimension. The variable $\mu_{ih}$ may be a mean of the $i_{th}$ set of temperature points in the $h_{th}$ dimension. In other words, in a three-dimensional space, a temperature point may be allotted to a cluster with a nearest mean point.

In Step 630, a mean point of a cluster of temperature points may be updated by equation eq1:

$$\mu_{ih} = \frac{1}{|S_i|} \sum_{x_j \in S_i} x_{jh}; h = 1, 2, 3. \quad \text{(eq2)}$$

In the equation, the variable $S_i$ may be a set including an $i_{th}$ set of temperature points, and $|S_i|$ may be number of the $i_{th}$ set of temperature points. In other words, in a three-dimensional space, mean points may be obtained according to distributed locations of temperature points and used to be updated mean points.

In Step 640, it may be checked if an obtained mean point has been fixed. If the mean point is still changed, the temperature points need to be allotted again to confirm the mean point again.

In Steps 645 and 650, equations eq3a to eq3c may be referred to.

$$A1 = \Sigma_{i=1}^{P} \Sigma_{x_j \in S_i} \Sigma_{h=1}^{3} (x_{jh} - \mu_{ih})^2 \quad \text{(eq3a);}$$

$$A2 = \Sigma_{x_j \in S_i} \Sigma_{h=1}^{3} (x_{jh} - \mu_h)^2 \quad \text{(eq3b);}$$

$$A1/A2 = Rt \quad \text{(eq3c).}$$

The numerator A1 may correspond to a deviation of each of p clusters of the second set of temperature points T2. The denominator A2 may correspond to a total deviation obtained by regarding the second set of temperature points T2 on the rectangular area 410 as a whole set. When the ratio Rt exceeds the predetermined threshold (e.g. 10%), variation in each set of temperature points may be excessive, so p (i.e. the number of clusters) needs to be increased to make the result of clustering temperature points more reasonable. In this case, Step 655 may be performed to update p by incrementing p by 1. On the other hand, if the ratio Rt is smaller than the predetermined threshold, p (i.e. the number of clusters) may be reasonable. Hence, the p clusters of temperature points may be regarded as the n sets of temperature points G1-Gn. In other words, p=n at the time. It may conclude clustering the temperature points.

Figure 7:
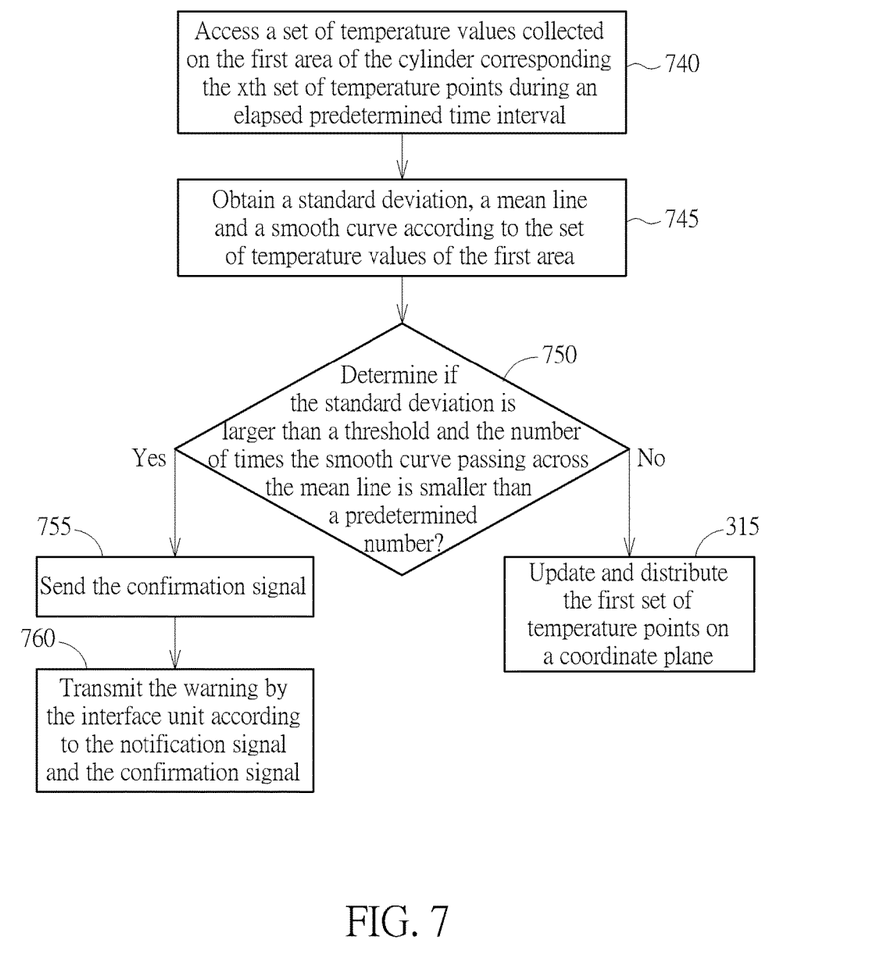
FIG. 7 illustrates a flowchart of a method for monitoring equipment according to another embodiment.

FIG. 7 illustrates a flowchart of a method for monitoring equipment according to another embodiment. The flow in FIG. 7 may be performed after Step 330 of FIG. 3 and may include following steps.

Step 740: access a set of temperature values Th collected on the first area R1 of the cylinder 155 corresponding the $x_{th}$ set of temperature points Gx during an elapsed predetermined time interval Dh;
Step 745: obtain a standard deviation, a mean line Ac and a smooth curve Rc according to the set of temperature values Th of the first area R1;
Step 750: determine if the standard deviation is larger than a threshold and the number of times the smooth curve Rc passing across the mean line Ac is smaller than a predetermined number? If so, go to Step 755; else, go to Step 315;
Step 755: send the confirmation signal Sc; and
Step 760: transmit the warning Sw by the interface unit 130 according to the notification signal Sn and the confirmation signal Sc.

The predetermined time interval Dh in Step 740 may be 72 hours, 120 hours or another appropriate time interval. The set of temperature values Th collected during the predetermined time interval Dh may be historic temperature data on the first area R1 and may be obtained from a log file. Steps 740 to 750 may be confirmation steps. If an $x_{th}$ set of temperature points Gx on the first area R1 has met the first condition and the second condition mentioned above, Steps 740 to 750 may be performed to confirm whether to transmit the warning Sw or not.

Figure 8:
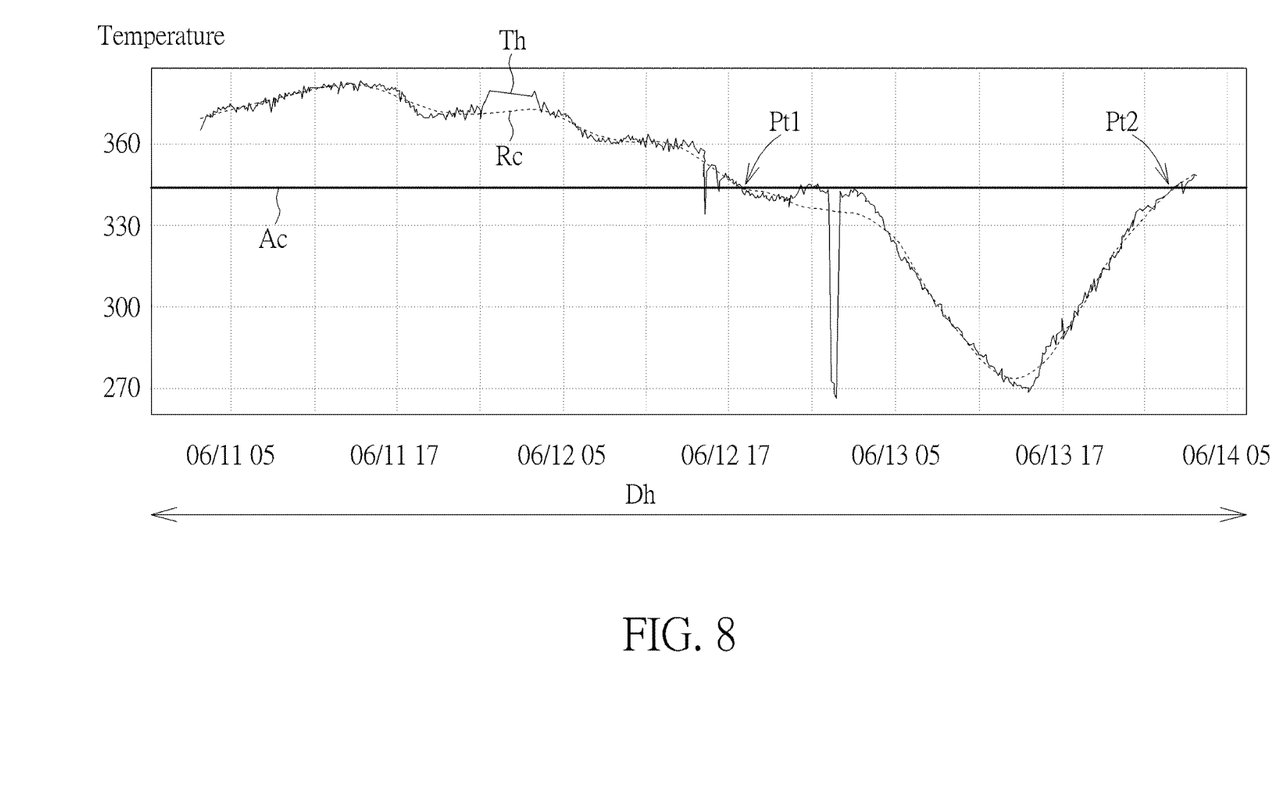
FIG. 8 illustrates a statistical graph according to the temperature values collected during a predetermined time interval according to an embodiment.

FIG. 8 illustrates a statistical graph according to the temperature values Th collected during the predetermined time interval Dh according to an embodiment. The line graph of the temperature values Th in FIG. 8 may be illustrated by performing a calculation with temperature values at time points of the predetermined time interval Dh. A local regression fitting calculation may be used to obtain the smooth curve Rc. The smooth curve Rc may represent tendencies of changes of the temperature values Th. When the standard deviation of the temperature values Th exceeds the threshold, the temperature values Th may correspond to a lower stability. In addition, when the number of times the smooth curve Rc passing across the mean line Ac is smaller than a predetermined number, the temperature values Th may distribute farther from a mean value. Hence, abnormality of temperature may be determined. Thus, when the condition of Step 750 is met, the warning Sw may be sent. Table-1 below may be referred to. FIG. 8 merely provides an example, and the smooth curve Rc may pass across the mean line Ac through two cross points Pt1 and Pt2.

The following Table-1 may describe conditions when performing the flows of FIG. 3 and FIG. 7 to check a cement rotation kiln. When the notification signal Sn is sent on Step 330, it may be checked that if the standard deviation of the temperature values Th of the first area R1 is larger than the threshold and the number of times the smooth curve Rc passing across the mean line Ac is smaller than the predetermined number according to Steps 740 to 750. Hence, four conditions may occur as shown in the following table.

TABLE 1

| Conditions of checking a cement rotation kiln | Standard deviation of the temperature values Th of the first area R1 exceeds the threshold. | Standard deviation of the temperature values Th of the first area R1 is smaller than the threshold. |
| --- | --- | --- |
| Number of times the smooth curve Rc passing across the mean line Ac exceeds the predetermined number. | (Condition 1) A crust problem may occur on the cement rotation kiln. | (Condition 2) A crust problem may occur on the cement rotation kiln. |
| Number of times the smooth curve Rc passing across the mean line Ac is smaller than the predetermined number. | (Condition 3) An overheat problem may occur on the cement rotation kiln, and it is determined to be abnormal. | (Condition 4) A crust problem may occur on the cement rotation kiln. |

As shown in Table-1, Condition 3 may correspond to that the conditions of Step 750 are met, so the confirmation signal Sc may be sent through the interface unit 130 under Condition 3. Under Conditions 1, 2 and 4, a user may be reminded to pay more attention to manage the equipment, and the results may be recorded to a log file to be read afterward. For example, an abnormal warning of a higher emergency level may be sent under Condition 3, and an alarm of a lower emergency level may be sent under Conditions 1, 2 and 4. Table-1 is merely shown to provide an example to describe an application according to an embodiment rather than limiting scope of the present invention. A user may adjust settings of trigger a warning according to engineering requirements and experiences.

The notification signal Sn and the confirmation signal Sc described above (e.g. Sn and Sc in FIG. 1) are for reference merely and illustrated to describe operational principles according to embodiments. When building the system 100, detailed structure may be adjusted reasonably. For example, the notification signal Sn and the confirmation signal Sc may be used to generate a control signal using a logic gate or a control program for more convenient control. It is still within the scope of the invention to adjust the techniques reasonably.

In summary, by means of system and methods described above, distribution, changes and historic record of temperature values on a cylinder may be monitored. Abnormality of temperature may be detected so as to send a warning. The monitored equipment may be checked and repaired to avoid being damaged. In addition, the number of false alarms may be reduced to improve reliability of early warning. Hence, the present invention is advantageous for an industry such as cement, food processing, chemical, pharmaceutical or paper which uses cylinders to heat materials.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for monitoring equipment, the equipment having a cylinder, the cylinder having a length corresponding to a horizontal axis of a coordinate plane and a plurality of rotation degrees corresponding to a vertical axis of the coordinate plane, and the method comprising:
   collecting a first set of temperature points when the cylinder rotates using a set of sensors disposed beside the cylinder wherein each temperature point has a horizontal coordinate of the horizontal axis, a vertical coordinate of the vertical axis and a temperature value;
   updating and distributing the first set of temperature points on the coordinate plane;
   segmenting the coordinate plane along the horizontal axis with a fixed length to define a rectangular area wherein a second set of temperature points is distributed on the rectangular area, and the second set of temperature points is a subset of the first set of temperature points;
   clustering the second set of temperature points into n sets of temperature points on the rectangular area using a k means algorithm; and
   sending a notification signal according to at least an $x_{th}$ set of temperature points of the n sets of temperature points;
   wherein n and x are positive integers, n>1, 0<x<(n+1), and the $x_{th}$ set of temperature points has a highest mean temperature among the n sets of temperature points.

2. The method of claim 1, wherein sending the notification signal according to at least the $x_{th}$ set of temperature points of the n sets of temperature points comprises:
   sending the notification signal when a highest temperature value of the $x_{th}$ sets of temperature points exceeds a threshold.

3. The method of claim 1, wherein sending the notification signal according to at least the $x_{th}$ set of temperature points of the n sets of temperature points comprises:
   defining a second area in the rectangular area according to a left boundary and a right boundary of a first area wherein the $x_{th}$ set of temperature values is on the first area and the first area is within the second area; and
   sending the notification signal when a quotient exceeds a threshold wherein the quotient is obtained by dividing a mean of the $x_{th}$ set of temperature values by a mean of temperature values of the second area excluding the first area.

4. The method of claim 1, wherein sending the notification signal according to at least the $x_{th}$ set of temperature points of the n sets of temperature points comprises:
   defining a second area in the rectangular area according to a left boundary and a right boundary of a first area wherein the $x_{th}$ set of temperature points is on the first area and the first area is within the second area; and sending the notification signal when a highest temperature value of the $x_{th}$ set of temperature values exceeds a first threshold, and a quotient exceeds a second threshold wherein the quotient is obtained by dividing a mean temperature of the $x_{th}$ set of temperature points by a mean temperature of temperature points of the second area excluding the first area.

5. The method of claim 1, wherein the first set of temperature points is updated and distributed on the coordinate plane periodically with a fixed time period.

6. The method of claim 1, wherein clustering the second set of temperature points into the n sets of temperature points on the rectangular area using the k means algorithm comprises:
 selecting initial p mean points on the rectangular area;
 allotting each temperature point of the second set of temperature points to a cluster having a mean point closest to the temperature point to generate p clusters of temperature points;
 calculating a mean for each of the p clusters of temperature points to update the p mean points;
 after the p mean points have fixed, calculating a ratio of a deviation of each of the p clusters of temperature points and a total deviation of the second set of temperature points; and
 when the ratio exceeds a threshold, incrementing p by 1;
 wherein p is a positive integer and p>1.

7. The method of claim 1, wherein clustering the second set of temperature points into the n sets of temperature points on the rectangular area using the k means algorithm comprises:
 selecting initial p mean points on the rectangular area;
 allotting each temperature point of the second set of temperature points to a cluster having a mean point closest to the temperature point to generate p clusters of temperature points;
 calculating a mean for each of the p clusters of temperature points to update the p mean points;
 after the p mean points have fixed, calculating a ratio of a deviation of each of the p clusters of temperature points and a total deviation of the second set of temperature points; and
 when the ratio is smaller than a threshold, using the p clusters of temperature points to be the n sets of temperature points;
 wherein p is a positive integer and p>1.

8. The method of claim 1, further comprising:
 accessing a set of temperature values collected on a first area of the cylinder corresponding the $x_{th}$ set of temperature points during an elapsed predetermined time interval;
 obtaining a standard deviation, a mean line and a smooth curve according to the set of temperature values of the first area; and
 sending a confirmation signal when the standard deviation is larger than a threshold and number of times the smooth curve passing across the mean line is smaller than a predetermined number.

9. The method of claim 8, wherein a local regression fitting calculation is used to obtain the smooth curve according to the set of temperature values of the first area.

10. An equipment monitor system configured to monitor a cylinder, comprising:
 a set of sensors disposed beside the cylinder and configured to collect a first set of temperature points when the cylinder rotates wherein each temperature point has a horizontal coordinate of a horizontal axis, a vertical coordinate of a vertical axis and a temperature value;
 a processor linked to the set of sensors and configured to receive the first set of temperature points, generate a coordinate plane with the horizontal axis corresponding to a length of the cylinder and the vertical axis corresponding to a plurality of rotation degrees of the cylinder, update and distribute the first set of temperature points on the coordinate plane, segment the coordinate plane along the horizontal axis with a fixed length to define a rectangular area with a second set of temperature points distributed on the rectangular area, use a k means algorithm to cluster the second set of temperature points into n sets of temperature points, and send a notification signal according to at least an $x_{th}$ set of temperature points of the n sets of temperature points, wherein the second set of temperature points is a subset of the first set of temperature points, n and x are positive integers, n>1, 0<x<(n+1), and the $x_{th}$ set of temperature points has a highest mean temperature among the n sets of temperature points;
 an interface unit linked to the processor and configured to receive the notification signal and transmit a human perceivable warning according to at least the notification signal.

* * * * *